(12) United States Patent  
Hirai

(10) Patent No.: US 6,622,248 B1
(45) Date of Patent: Sep. 16, 2003

(54) FILE DATA RETRIEVING DEVICE AND RECORDING MEDIUM CONTAINING COMPUTER PROGRAM FOR CONTROLLING THE SAME

(75) Inventor: Tokuyuki Hirai, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/339,760

(22) Filed: Jun. 24, 1999

(30) Foreign Application Priority Data

Jun. 25, 1998 (JP) .......................................... 10-178948

(51) Int. Cl.$^7$ ................................................ G06F 1/24
(52) U.S. Cl. ........................ 713/193; 713/200; 713/201
(58) Field of Search ................................. 713/193, 200, 713/201

(56) References Cited

U.S. PATENT DOCUMENTS

| 4,118,788 A | * | 10/1978 | Roberts ........................... 707/3 |
| 5,704,060 A | * | 12/1997 | Del Monte .............. 707/104.1 |
| 5,710,719 A | * | 1/1998 | Houle ......................... 382/232 |
| 5,713,009 A | * | 1/1998 | DeRosa et al. ................. 713/2 |

FOREIGN PATENT DOCUMENTS

| JP | 5-101102 | 4/1993 |
| JP | 6-149153 | 5/1994 |
| JP | 9-44521 | 2/1997 |

* cited by examiner

Primary Examiner—Thomas R. Peeso
(74) Attorney, Agent, or Firm—Edwards & Angell, LLP; David G. Conlin; George W. Hartnell, III

(57) ABSTRACT

A file data retrieving device includes: an input section for inputting a search character string and various instructions; a storage section that previously stores a plurality of encoded file data; a decoding section for decoding the encoded file data by use of a cryptograph key prepared in advance; an extracting section for extracting, from the decoded file data, a file name and a plurality of key words related to the file data; an encoding section for encoding the extracted key words; a storage processing section for allowing the storage section to store the encoded key words as access keys of the file data in correspondence with the stored file data; and a retrieving section for allowing the encoding section to encode the search character string which is input by the input section for retrieving the file name of the encoded file data, searching for an access key that coincides with the encoded search character string, and retrieving the file name that corresponds to the access key. Also a recording medium contains a computer program for controlling the file data retrieving device.

4 Claims, 5 Drawing Sheets

FIG. 2
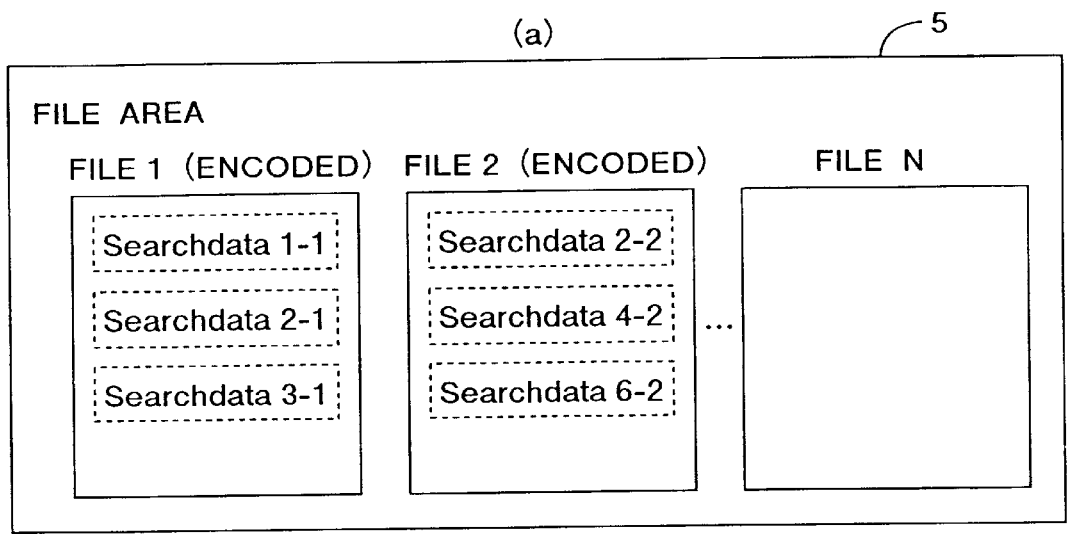
(b)
| PLAINTEXT KEY WORD | CIPHERTEXT KEY WORD |
|---|---|
| RETRIEVAL OBJECT 1-1 | Searchdata 1-1 |
| RETRIEVAL OBJECT 2-1 | Searchdata 2-1 |
| RETRIEVAL OBJECT 3-1 | Searchdata 3-1 |
| RETRIEVAL OBJECT 2-2 | Searchdata 2-2 |
| RETRIEVAL OBJECT 4-2 | Searchdata 4-2 |
| RETRIEVAL OBJECT 6-2 | Searchdata 6-2 |
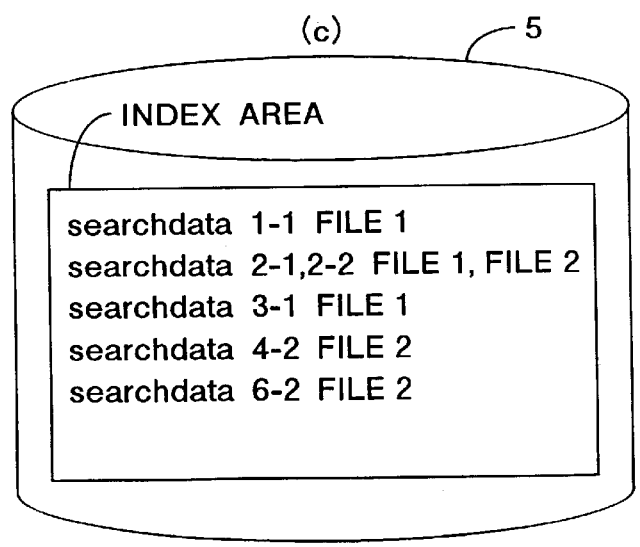

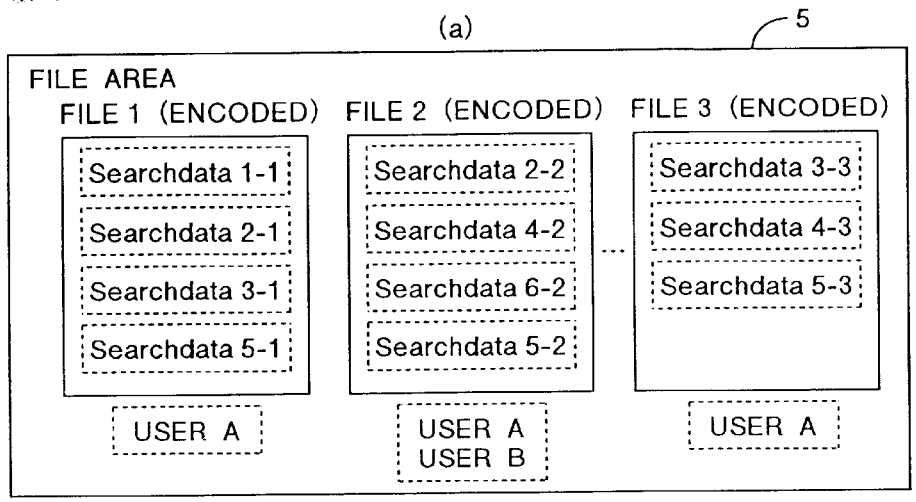

(b)

| PLAINTEXT KEY WORD | CIPHERTEXT KEY WORD | USER KEY |
|---|---|---|
| RETRIEVAL OBJECT 1-1 | Searchdata 1-1 | USER A |
| RETRIEVAL OBJECT 2-1 | Searchdata 2-1 | USER A |
| RETRIEVAL OBJECT 2-2 | Searchdata 2-2 | USER A USER B |
| RETRIEVAL OBJECT 3-1, 3-3 | Searchdata 3-1, 3-3 | USER A |
| RETRIEVAL OBJECT 4-2 | Searchdata 4-2 | USER A USER B |
| RETRIEVAL OBJECT 4-3 | Searchdata 4-3 | USER A |
| RETRIEVAL OBJECT 5-1, 5-3 | Searchdata 5-1, 5-3 | USER A |
| RETRIEVAL OBJECT 5-2 | Searchdata 5-2 | USER A,B |
| RETRIEVAL OBJECT 6-2 | Searchdata 6-2 | USER A USER B |

(c)

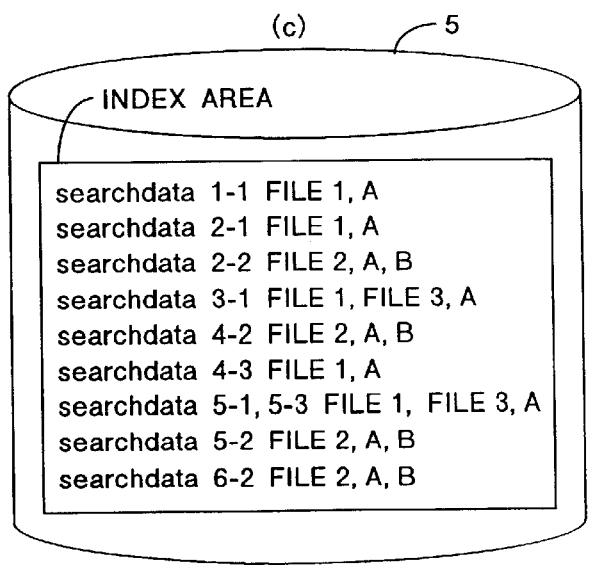

FILE DATA RETRIEVING DEVICE AND RECORDING MEDIUM CONTAINING COMPUTER PROGRAM FOR CONTROLLING THE SAME

CROSS-REFERENCES TO RELATED APPLICATIONS

This application is related to Japanese patent application No. HEI 10-178948 filed on Jun. 25, 1998 whose priority is claimed under 35 USC §119, the disclosure of which is incorporated herein by reference in its entirety.

BACKGROUND OF THE INVENTION

1. Field of the Invention

The present invention relates to a file data retrieving device and a recording medium containing a computer program for controlling the same, and more particularly to a file data retrieving device and a recording medium for use thereof which are applied to a document processing apparatus, such as a word processor or a personal computer, for retrieving a specific file data from a plurality of encoded file data stored in a storage device.

2. Description of the Related Art

In recent years, in accordance with a spread of word processors and personal computers, a large amount of document data are utilized at a place of work or at home. Large-capacity databases and high speed retrieving machines have been studied and developed in order to rearrange and utilize a large amount of such document data effectively.

In the meantime, a document that must maintain its secrecy is stored in a database in a form encoded by cryptography.

As a file retrieval method that does not use cryptography, there are known, for example, a full text search method and a key word search method.

For example, as a full text search method, Japanese Unexamined Patent Publication No. HEI 05(1993)-101102 proposes a retrieving device that enables effective retrieval by reducing the volume of the file to be used for presearch in the full text search on the basis of the full text search method by which the required document data are drawn out from a secondary storage device that stores a large amount of document data without giving index information for retrieval.

On the other hand, as a key word search method, Japanese Unexamined Patent Publication No. HEI 09(1997)-44521 proposes an index making device and a document retrieving device for specifying a document by registering, as a common identifier (i.e., an index), a word selected from a plurality of different representations in registering the documents and comparing an input key word with the index by utilizing the index in the retrieving process.

Further, known cryptography methods include, for example, symmetric cryptography methods and asymmetric cryptography methods.

A symmetric cryptography method is a cryptography method in which the same key is used for encoding and decoding processes. In this method, a cryptography communication is not possible unless the sender and the receiver share a common key data, so that the problem is how the key can be safely shared. This method is referred to as "private key cryptography" because the key must be kept secret.

An asymmetric cryptography method is a cryptography method in which different keys are used for an encoding process and a decoding process. This method eliminates the need to share the same information in secret among the communicating parties by making a cryptograph key publicly known and keeping a decoding key retained in secret. This method is referred to as "public key cryptography" because one key is made publicly known.

For example, as a symmetric cryptography method, Japanese Unexamined Patent Publication No. HEI 06(1994)-149153 proposes a general-purpose high-speed cryptography device utilizing a FEAL (fast data encipherment algorithm) in which an enlarged key is created by means of an input such as a cryptography key having a 64 bit length and an fk function; the enlarged key is retained; and an input data having a 64 bit length, which is a plaintext or a ciphertext, and the retained enlarged key are encoded or decoded by means of an exclusive logical sum and an f function.

On the other hand, as an asymmetric cryptography method, Japanese Unexamined Patent Publication No. HEI 06(1994)-169306 proposes a protocol and a device in which a message part of a public key distribution method is encoded into asymmetric cryptograph keys and the asymmetric cryptograph keys are exchanged with each other to establish a safe communication among a plurality of parties that share a secret key.

Also, a translated document by Yuu Inamura, "Encipherment of electronic mails by PGP, S/MIME, Japanese version of DDJ, February 1998 (magazine code 16665-02)-, Author's preface to the book: "PGP Source Code and Internals", by Philip Zimmermann ISBN 0-262-24039-4)" discloses a cryptography processing of PGP (Pretty Good Privacy).

This PGP method uses a symmetric cryptography and an asymmetric cryptography in combination, whereby after an extra key data which differs for each encoding process is created to encode a message body in a symmetric manner, the extra key itself is encoded in an asymmetric manner by using a public key of a receiver, and both of the encoded message body and the encoded extra key are sent to the receiver. The receiver of the message decodes the extra key by means of the receiver's secret key and then decodes the extra key by means of the receiver's secret key and then decodes the message body by means of the extra key thus decoded.

However, the full text search method disclosed in Japanese Unexamined Patent Publication NO. HEI 05(1993)-101102 and the key word search method disclosed in Japanese Unexamined Patent Publication No. HEI 09(1997)-44521 are directed to plaintexts which are not encoded, and it is not possible to directly search for document data that are stored in an encoded form.

Therefore, in the above-mentioned full text search method, the searching process must be carried out after all the encoded document data are decoded. This necessitates an enormous amount of processing in order to make a search among the document data existing in a large amount, thus requiring an extra management in order to safely maintain secrecy of the document data.

Further, in the above-mentioned key word search method, it is possible to search for a document file if all the document data are decoded to make indices and only the key words are stored as plaintexts. However, in this method, the key words are read, whereby the secrecy of the document data is destroyed even though the stored document data are encoded, thus requiring an extra management in order to safely maintain the secrecy of the document data.

The techniques disclosed in Japanese Unexamined Patent Publication No. HEI 06(1994)-149153, Japanese Unexamined Patent Publication No. HEI 06(1994)-169306, and the translated document by Yuu Inamura are directed to an encoding process and a decoding process for establishing a safe communication between parties that share a common secret key, and they do not disclose a technique of searching for a specific file at a high speed from a plurality of encoded file data stored in a storage device.

SUMMARY OF THE INVENTION

The present invention provides a file data retrieving device comprising: an input section for inputting a search character string and various instructions; a storage section that previously stores a plurality of encoded file data; a decoding section for decoding the encoded file data by use of a cryptograph key prepared in advance; an extracting section for extracting, from the decoded file data, a file name and a plurality of key words related to the file data; an encoding section for encoding the extracted key words; a storage processing section for allowing the storage section to store the encoded key words as access keys of the file data in correspondence with the stored file data; and a retrieving section for allowing the encoding section to encode the search character string which is input by the input section for retrieving the file name of the encoded file data, searching for an access key that coincides with the encoded search character string, and retrieving the file name that corresponds to the access key.

Also, the present invention provides a recording medium containing a computer program for controlling a file data retrieving device, the computer program performing the functions of: causing a computer operation to input a search character string and various instructions from an input section; causing a computer operation to previously store a plurality of encoded file data in a storage section; causing a computer operation to decode the encoded file data by use of a cryptograph key prepared in advance; causing a computer operation to extract, from the decoded file data, a plurality of key words and a file name related to the file data; causing a computer operation to encode the extracted keywords; causing a computer operation to store the encoded key words as access keys of the file data in the storage section in correspondence with the stored file data; and causing a computer operation to encode the search character string which is input by the input section for retrieving the file name of the encoded file data, to search for an access key that coincides with the encoded search character string, and to retrieve the file name that corresponds to the access key.

Thus, the present invention provides a file data retrieving device and a recording medium for use thereof in which a specific file data is retrieved by use of an encoded key word at a high speed from a plurality of encoded file data stored in a storage device while maintaining secrecy of the file data.

BRIEF DESCRIPTION OF THE DRAWINGS

The present invention will be better understood from the following detailed description of preferred embodiments of the invention, taken in conjunction with the accompanying drawings, in which:

FIGS. 2(a) to 2(c) are views showing an access registration process and an example of contents (1) to be stored in a storage section and applied to a file retrieving process according to an embodiment of the present invention;

FIGS. 4(a) to 4(c) are views showing an access registration process and an example of contents (2) to be stored in a storage section and applied to a file retrieving process according to an embodiment of the present invention.

DETAILED DESCRIPTION OF THE PREFERRED EMBODIMENTS

Figure 1:
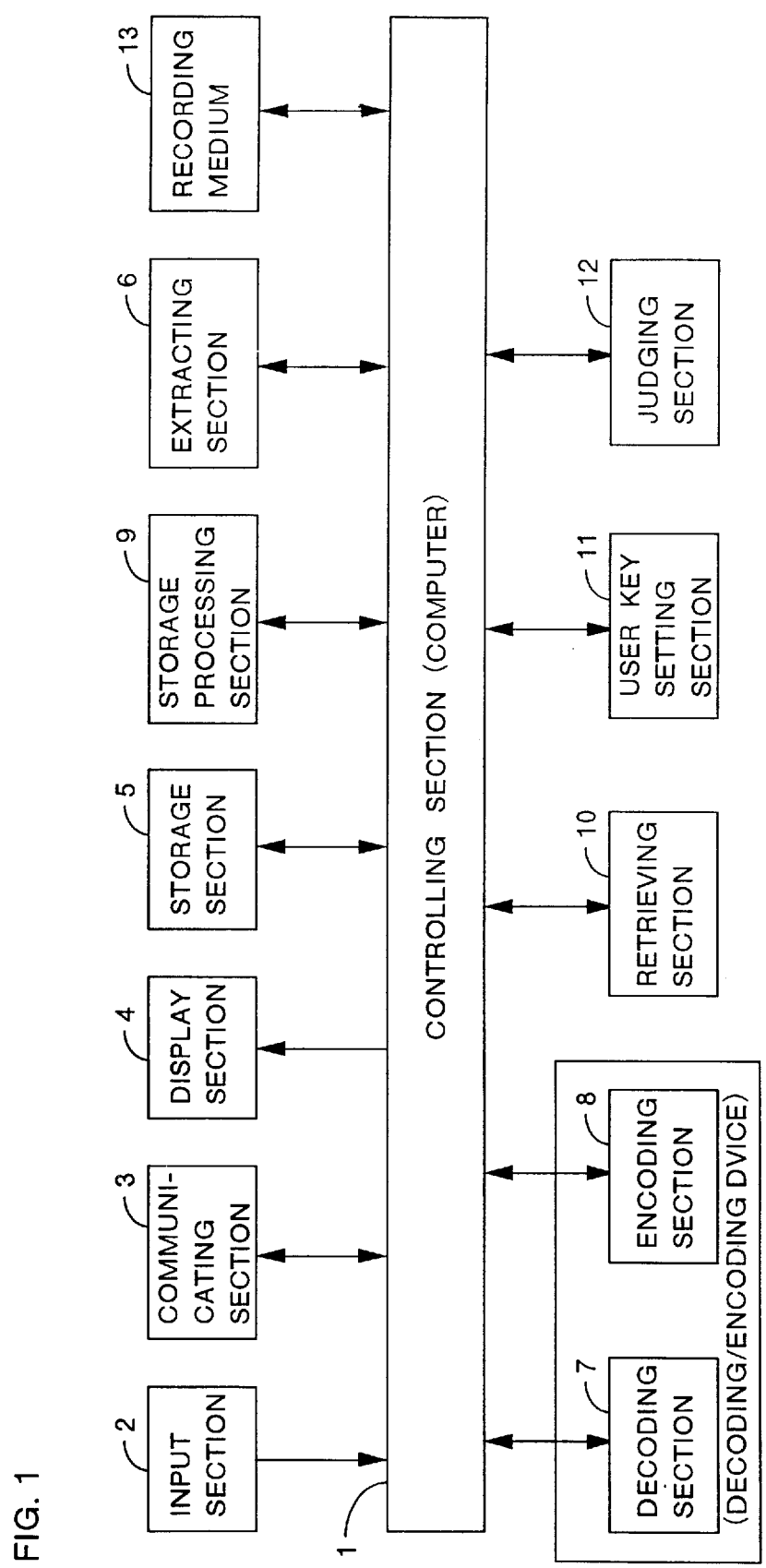
FIG. 1 is a block diagram showing a construction of a retrieving device according to the present invention.

A file data retrieving device according to the present invention in which a specific file data is retrieved by use of an encoded key word at a high speed from a plurality of encoded file data stored in a storage device while maintaining secrecy of the file data may include an input section, a storage section, a decoding section, an extracting section, an encoding section, a storage processing section and a retrieving section. An input device as the input section may include, for example, a keyboard, a mouse, a pointing device, or the like. A storage device as the storage section may include, for example, a RAM, a floppy disk, a hard disk, a writable CD-ROM, an MD, or the like.

The decoding section, the extracting section, the encoding section, the storage processing section, and the retrieving section may be constructed with a computer including a CPU, a RAM, a ROM, and an I/O port. The ROM may include a program that allows each section to perform its function. The RAM may function as a work buffer.

The file data retrieving device according to the present invention may further include a user key setting section for setting a user key by adding to the access key a name of a user who is permitted to access the access key, wherein, upon input of the user key by the input section, the retrieving section makes reference to the access keys stored in the storage section, retrieves an access key that corresponds to the user key from the storage section, and allows the decoding section to decode a file data corresponding to the file name by means of the retrieved access key.

Here, the user key setting section may be constructed with a CPU of a computer and a user key setting program.

Since this construction makes it possible to set a user key by adding to the access key a name of a user who is permitted to access the access key, the user can retrieve the encoded file name by utilizing the user key, and decode the file data corresponding to the retrieved file name.

The file data retrieving device according to the present invention may further include a judging section for judging whether a file data that has not been encoded is stored in the storage section, wherein upon judgment that a file data that has not been encoded is stored in the storage section, the extracting section is allowed to extract, from the file data that has not been encoded, a file name and a plurality of key words related to the file data; the storage processing section is allowed to store the extracted key words as access keys of the file data in the storage section in correspondence with the stored file data; and the retrieving section is allowed to search for an access key that coincides with the search character string which is input by the input section for retrieving the file name of the file data and to retrieve the file name that corresponds to the access key.

Here, the judging section may be constructed with a CPU of a computer and a judging program.

This construction makes it possible to retrieve a specific file at a high speed from a plurality of file data stored in the storage device irrespective of whether the file data are encoded or not.

According to another aspect, the present invention provides a recording medium containing a computer program for controlling a file data retrieving device, the computer program performing the functions of: causing a computer operation to input a search character string and various instructions from an input section; causing a computer operation to previously store a plurality of encoded file data in a storage section; causing a computer operation to decode the encoded file data by use of a cryptograph key prepared in advance; causing a computer operation to extract, from the decoded file data, a plurality of key words and a file name related to the file data; causing a computer operation to encode the extracted key words; causing a computer operation to store the encoded key words as access keys of the file data in the storage section in correspondence with the stored file data; and causing a computer operation to encode the search character string which is input by the input section for retrieving the file name of the encoded file data, to search for an access key that coincides with the encoded search character string, and to retrieve the file name that corresponds to the access key.

By using this recording medium, a file data retrieving device of the present invention is realized in which an intended file is picked up from a plurality of encoded file data stored in the storage section, and the file data is retrieved at a high speed.

EMBODIMENTS

Hereafter, the present invention will be detailed with reference to embodiments shown in the drawings. However, these embodiments are not intended to limit the scope of the present invention.

FIG. 1 is a block diagram showing a construction of a file data retrieving device according to the present invention. Referring to FIG. 1, a controlling section 1 for controlling each section of the retrieving device is constructed with a computer including a CPU, a ROM, a RAM, and an I/O port.

An input section 2 for inputting a search character string (key word) and various instructions is constructed with an input device such as a keyboard, a mouse, a pen/tablet, or a pointing device.

A communicating section 3 for establishing a connection to a network is constructed with a modem, an NCU (network controlling unit), and the like. The communicating section 3 serves to input and output file data through connection with an external data base.

A display section 4 displays a search key word, a file name, and the file data. The display section 4 is constructed with an LCD (liquid crystal display), a PD (plasma display), or the like.

A storage section 5 stores, in a file area, a plurality of file data input from the input section 2 or from the communicating section 3. The storage section 5 also stores, in an index area, key words (access keys) and file names. The storage section 5 is constructed with a storage device such as a RAM, a floppy disk, a hard disk, a writable CD-ROM, or an MD An extracting section 6 extracts, from a file data that is decoded or that is not encoded, a file name and a plurality of key words related to the file data. The extracting section 6 is constructed with a CPU and an extracting program.

A decoding section 7 decodes an encoded file data by using a cryptograph key (public key) which is prepared in advance. The decoding section 7 is constructed with a CPU and a decoding program.

An encoding section 8 encodes the key words and the file name that are extracted. The encoding section 8 is constructed with a CPU and an encoding program.

Here, the decoding section 7 and the encoding section 8 are constructed as a decoding/encoding device which stores a cryptograph key data and a decoding/encoding program capable of performing a cryptography process according to the symmetric encoding method, the asymmetric encoding method, or the PGP method.

A storage processing section 9 allows the storage section 5 to store the encoded key words and the encoded file name as access keys in the index area. The storage processing section 9 is constructed with a CPU and a storage processing program.

A retrieving section 10 allows the encoding section 8 to encode a search character string (key word) input from the input section 2, searches for an access key that coincides with the encoded search character string, and retrieves the file name that corresponds to the access key. The retrieving section 10 is constructed with a.CPU and a retrieving program. In the retrieving device according to this embodiment, the key word search method is adopted. However, the retrieval of ordinary documents may be performed by the full text search method.

A user key setting section 11 sets a user key by adding to the access key a name of a user who is permitted to access the access key. The user key setting section 11 is constructed with an input key, a CPU, and a user key setting program.

A judging section 12 judges whether a file data that has not been encoded is stored in the storage section 5. The judging section 12 is constructed with a CPU and a judging program.

A recording medium 13 stores a program for controlling the file data retrieving device of the present invention. The recording medium is constructed with an IC card made of an EEPROM, a floppy disk, a hard disk, a writable CD-ROM, or an MD.

The file data retrieving device of the present invention can be easily realized by installing the controlling program of the present invention stored in the recording medium 13, into a RAM of the controlling section 1 or into a RAM of a terminal computer.

For example, the recording medium 13 may contain a computer program for allowing the controlling section 1 (computer) to input a search character string and various instructions from the input section 2; to previously store a plurality of encoded file data in the storage section 5; to decode the encoded file data by use of a cryptograph key prepared in advance; to extract, from the decoded file data, a plurality of key words and a file name related to the file data; to encode the extracted key words; to store the encoded key words as access keys in the storage section 5; to encode the search character string input by the input section 2; to search for an access key that coincides with the encoded search character string; and to retrieve the file name that corresponds to the access key.

In this embodiment, the file data stored in the storage section 5 are a plurality of document data input from the input section 2 or the communicating section 3. As an example, an explanation will be given on a process for retrieving a file name and a file data by extracting specific key words from each file.

Also, the encoded file data and the key words are generally in the form of a random data sequence, so that they are hardly comprehensible even if shown in the drawings. Therefore, in this embodiment, the encoded data will be represented by a series of alphabetical letters for the purpose of illustration (See FIGS. 2 and 4).

FIGS. 2(a) to 2(c) are views showing an access registration process and an example of contents (1) to be stored in a storage section and applied to a file retrieving process according to this embodiment. FIG. 2(a) shows a file area of the storage section 5 that stores a sequence of encoded files. FIG. 2(a) illustrates encoded files 1, 2 and key words "Searchdata M-N" contained in the files 1, 2. Here, "N" represents an individual file name, and "M" represents an individual key word contained in the file N.

FIG. 2(b) is a table showing a correspondence between plaintext key words represented, for example, by "Retrievalobject M-N" and ciphertext key words represented, for example, by "Searchdata M-N". These correspond to the key words contained in the files 1 and 2 shown in FIG. 2(a). The plaintext key words are extracted by the extracting section from the decoded plaintext file data. The table shown in FIG. 2(b) is not stored in an index area of the storage section shown in FIG. 2(c).

For example, the plaintext key words extracted by the extracting section 6 are encoded by the encoding section 8, and the storage processing section 9 stores a pair of a ciphertext key word and a file name as an access key in the index area of the storage section 5.

For example, the Searchdata 1-1 (ciphertext keyword 1-1) is contained in the file 1 (representing a file name); the Searchdata 2-1, 2-2 (ciphertext key words 2-1, 2-2) are contained in the file 1 and the file 2; and the Searchdata 3-1 (ciphertext key word 3-1) is contained in the file 1.

Figure 3:
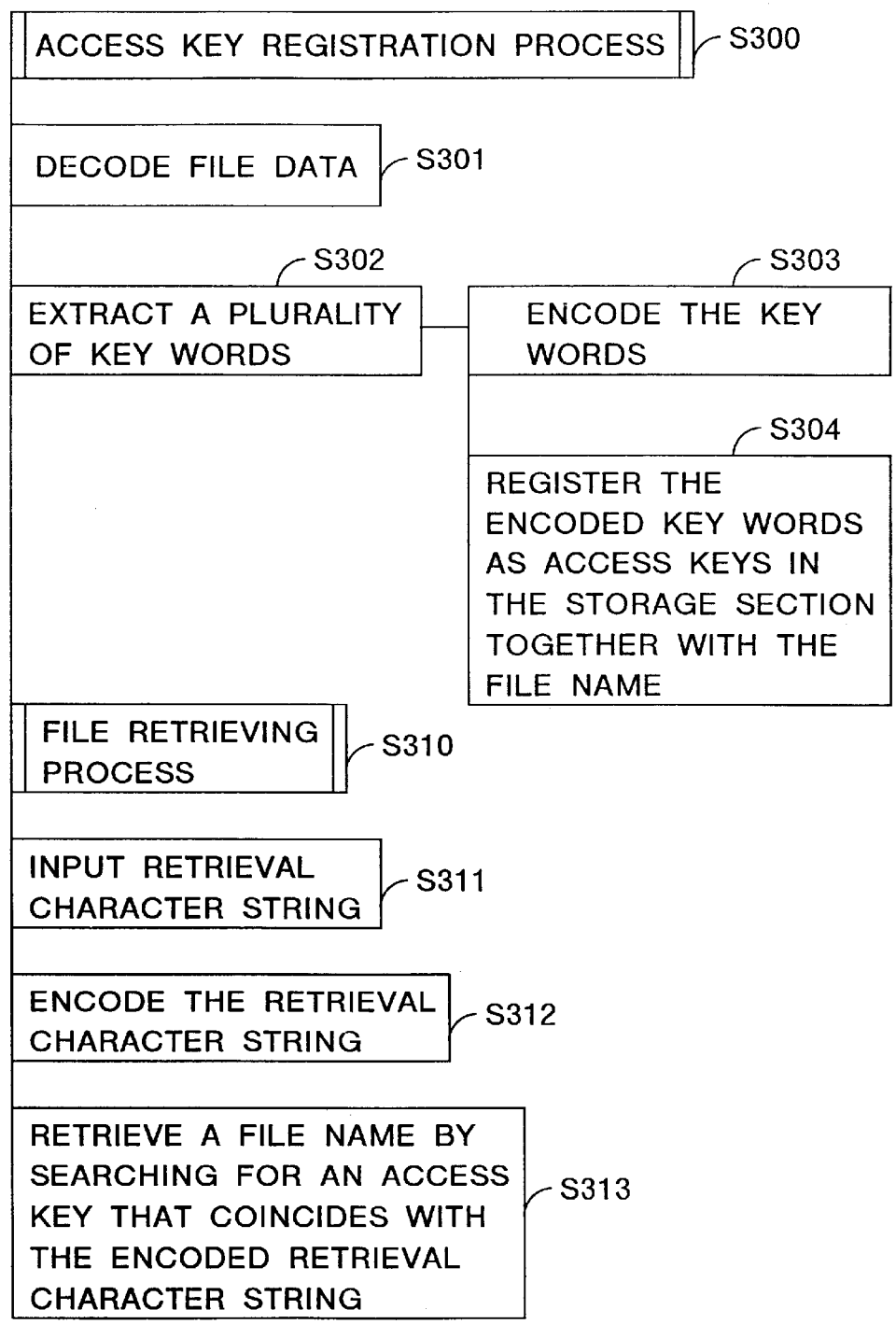
FIG. 3 is a flowchart showing an access key registration process and a procedure (1) for a file retrieving process according to an embodiment of the present invention.

FIG. 3 is a flowchart showing an access key registration process and a procedure (1) for a file retrieving process according to this embodiment. The symbol "S300" in FIG. 3 shows a routine of the access key registration process, and the symbol "S310" in FIG. 3 shows a routine of the file retrieving process.

[Access Key Registration Routine]

S301 : The file data of ciphertexts stored in the storage section 5 are read out and decoded into file data of plaintexts in the decoding section 7, and the decoded file data are sent to the extracting section 6.

S302 : The extracting section 6 extracts a plurality of key words as a search object from the plaintext file data and sends the key words to the encoding section 8.

S303 : The encoding section 8 encodes the extracted plaintext key words and sends the encoded key words to the storage processing section 9.

S304 : The storage processing section 9 registers the encoded key words as access keys together with a file name in the index area of the storage section 5.

The steps from S301 to S304 are repeated for every file so that the key words contained in each file may be stored in the index area of the storage section 5. For example, the key words and the file names from the file 1 and the file 2 are registered as access keys in the index area, as shown in FIG. 2(c).

[File Retrieval Routine]

S311 : A search character string is input as a key word from the input section 2 and sent to the encoding section 8.

S312 : The encoding section 8 encodes the search character string and sends the encoded search character string to the retrieving section 10.

S313 : The retrieving section 10 searches for an access key that coincides with the encoded search character string and retrieves a file name that corresponds to the access key.

Accordingly, the file data corresponding to the retrieved file name can be decoded by use of a cryptograph key prepared in advance, whereby the intended file data can be obtained.

According to the above-mentioned process, a specific file can be retrieved by use of an encoded key word at a high speed from a plurality of encoded files stored in a storage device while maintaining secrecy of the file data.

With reference to FIG. 2, a procedure for the file retrieving process will be concretely explained. For example, it is assumed that the search character string input from the input section 2 corresponds to plaintext key words "Retrievalobject 2-1, 2-2". Through the process in the step S312, the search character string is encoded into ciphertext key word "Searchdata 2-1, 2-2". A file search is performed by using the encoded key word "Searchdata 2-1, 2-2" in the step S313, whereby it is found out that the encoded key word matches with the "Searchdata 2-1, 2-2" registered on line 2 in the index area of the storage section 5, as shown in FIG. 2(c).

As a result, the file names "File 1" and "File 2" are obtained. Through this retrieving process, the file names are retrieved as retrieval objects while the files themselves are kept encoded. Once the file name is specified, the file data corresponding to the file name is decoded by use of the cryptograph key and output to the display section 4, whereby the user can obtain the intended file data.

FIGS. 4(a) to 4(c) are views showing an access registration process and an example of contents (2) to be stored in a storage section and applied to a file retrieving process according to this embodiment.

The decoding section 7 and the encoding section 8 are allowed to include, for example, an encoding function of PGP, i.e. "a function of designating a plurality of decodable extra keys at the time of encoding".

Generally, by designating a plurality of extra keys, it is possible to assign the decodable extra keys to a plurality of users. In other words, the above-mentioned function may be referred to as "a function of designating a plurality of decodable user keys at the time of encoding". In this embodiment, an access key corresponding to a user is referred to as "a user key".

FIG. 4(a) shows a file area of the storage section 5 that stores a sequence of files that has been already encoded. FIG. 4(a) illustrates encoded files 1, 2, 3, ciphertext keywords "Searchdata M-N" contained in the files 1, 2, 3, and users permitted to retrieve the respective files. The symbol "N" represents individual files, and the symbol "M" represents individual key words contained in the file N.

For example, the file data 1 and the file data 3 each correspond to the user A, and the file data 2 corresponds to the user A and the user B. The user key setting section 11 can set a user key corresponding to each user by adding a user name to a key word.

Therefore, the corresponding ciphertext key word "Searchdata M-N" can be made available by means of the user key, and further the corresponding file can be retrieved.

FIG. 4(b) is a table showing a correspondence between plaintext key words represented, for example, by "Retrievalobject M-N" and ciphertext key words represented, for example, by "Searchdata M-N". These correspond to the key words contained in the files 1, 2, 3 shown in FIG. 4(a). The plaintext key words are extracted by the extracting section 6 from the decoded plaintext file data. To each key word is assigned a user (users) who is (are) permitted to decode the file. The table shown in FIG. 4(b) is not stored in an index area of the storage section 5 shown in FIG. 4(c).

For example, the plaintext key words extracted by the extracting section 6 are encoded by the encoding section 8, and the storage processing section 9 stores a pair of a ciphertext key word and a file name as an access key in the index area of the storage section 5.

For example, the Searchdata 1-1 (ciphertext keyword 1-1) is contained in the file 1 (representing a file name); the Searchdata 2-1, 2-2 (ciphertext key words 2-1, 2-2) are contained in the file 1 and the file 2; and the Searchdata 3-1 (ciphertext key word 3-1) is contained in the file 1 and the file 3.

Since this process makes it possible to set a user key by adding to the access key a name of a user who is permitted to access the access key, the user can retrieve the encoded file name by utilizing the user key, and decode the file data corresponding to the retrieved file name.

Figure 5:
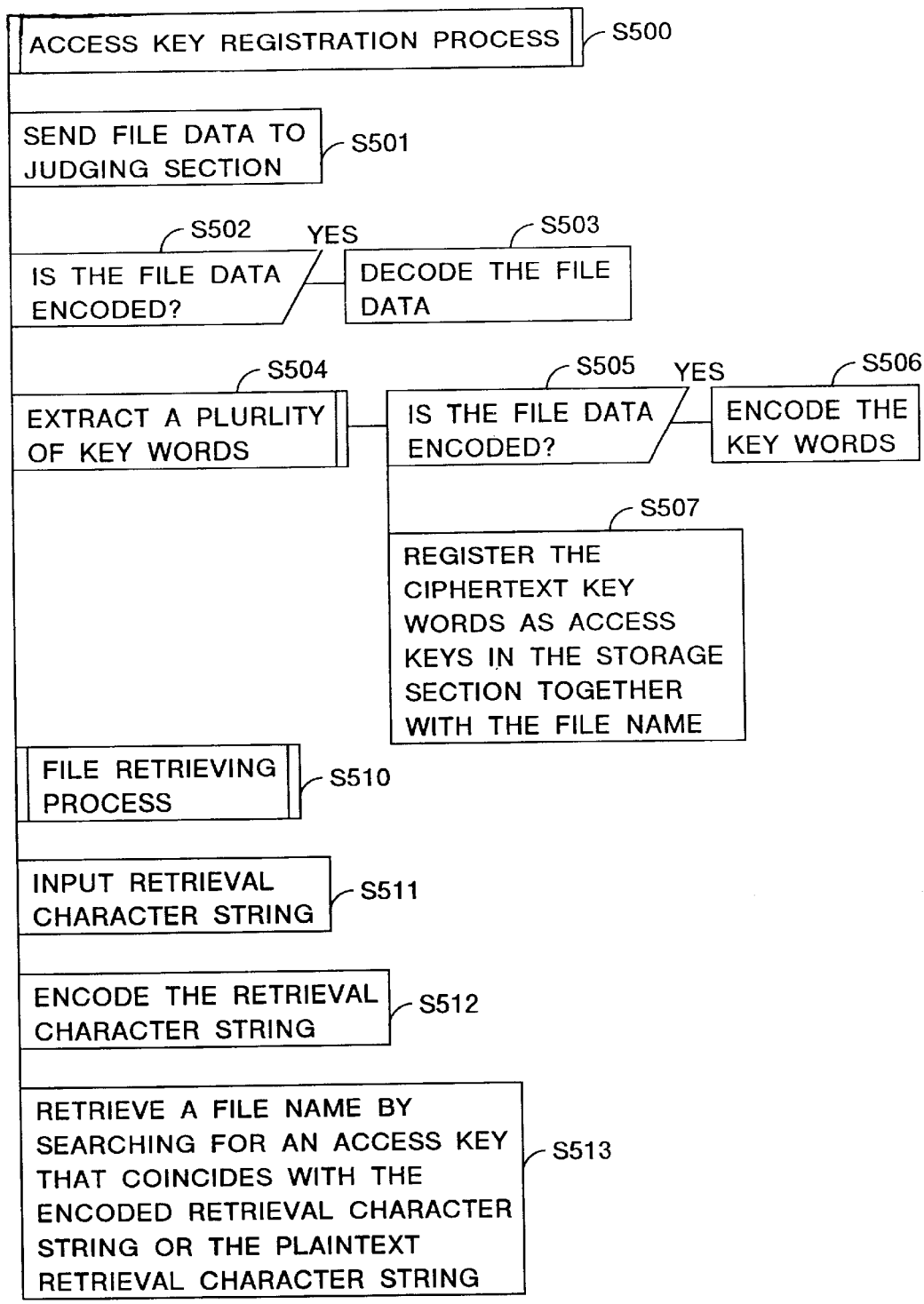
FIG. 5 is a flowchart showing an access key registration process and a procedure (2) for a file retrieving process according to an embodiment of the present invention.

FIG. 5 is a flowchart showing an access key registration process and a procedure (2) for a file retrieving process according to this embodiment. The symbol S500 in FIG. 5 represents a routine of the access key registration process, and the symbol S510 in FIG. 5 represents a routine of the file retrieving process. The routine of the access key registration process includes a routine for judging whether the file is a plaintext or a ciphertext.

The files stored as plaintexts in the storage section 5 are stored in the index area without encoding the key words. The files stored as ciphertexts in the storage section are stored in the index area after the key words are encoded. Therefore, the judging routine is provided in order to judge in the judging section 12 whether the file is an encoded one or not.

[Access Key Registration Routine]

S501 : The file data stored in the storage section 5 is sent to the judging section 12.

S502 : The judging section 12 judges whether the file data is an encoded one or not, and sets the judgment result in a flag. The encoded file data is sent to the decoding section 7.

S503 : The decoding section 7 decodes the encoded file data and sends it to the extracting section 6.

S504 : The extracting section 6 extracts plaintext key words from the file data that has been decoded or that has not been encoded.

S505 : Using the flag, the judging section 12 judges whether the file data is an encoded one or not. If the file data is an encoded one, the plaintext key words are sent to the encoding section 8.

S506 : The encoding section 8 encodes the plaintext key words and sends them to the storage processing section 9.

S507 : The storage processing section 9 registers the ciphertext key words or the plaintext key words as access keys together with a file name in the index area of the storage section 5. If the original file data is not an encoded one, the encoding process of the step S506 is skipped, whereby the plaintext key words are registered in the index area of the storage section 5 without being encoded.

[File Retrieval Routine]

S511 : A search character string is input as a key word from the input section 2 and sent to the encoding section 8 and the retrieving section 10.

S512 : The encoding section 8 encodes the search character string and sends it to the retrieving section 10.

S513 : The retrieving section 10 searches for an access key that coincides with the plaintext search character string or the ciphertext search character string, and retrieves the file name that corresponds to the access key.

This process makes it possible to retrieve a specific file at a high speed from a plurality of file data stored in the storage device irrespective of whether the file data are encoded or not.

By these processes, the following effects are produced.

(1) The files can be retrieved at a high speed while maintaining the file data in their encoded state.

(2) The users who are permitted to retrieve the file data can be set for each data. Therefore, it is possible to perform a fine and detailed data management. Also, this data management can be performed without depending on a manager of the database, and the user who encodes the file data can designate a user who is permitted to access the file data, so that the facility in using the storage device (database) can be improved.

(3) It is possible to select for each data whether the data is to be stored as a plaintext or as a ciphertext, and the data can be retrieved by the same retrieving section irrespective of the form in which the data is stored. This eliminates the need to use different retrieval methods for the plaintext file data and the ciphertext file data, whereby the data management can be performed with less labor. Further, it is not necessary for the user to memorize whether the stored file data is a plaintext or a ciphertext, so that the facility in file retrieving is improved As shown and explained above, according to the present invention, a specific file can be retrieved by use of an encoded key word at a high speed from a plurality of encoded files stored in a storage device while maintaining secrecy of the file data.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

I claim:

1. A file data retrieving device comprising:
   an input section for inputting a search character string and various instructions;
   a storage section that previously stores a plurality of encoded file data;
   a decoding section for decoding the encoded file data by use of a cryptograph key prepared in advance;
   an extracting section for extracting, from the decoded file data, a file name and a plurality of key words related to the file data;
   an encoding section for encoding the extracted key words;
   a storage processing section for allowing the storage section to store the encoded key words as access keys of the file data in correspondence with the stored file data; and
   a retrieving section for allowing the encoding section to encode the search character string which is input by the input section for retrieving the file name of the encoded file data, searching for an access key that coincides with the encoded search character string, and retrieving the file name that corresponds to the access key.

2. A file data retrieving device of claim 1, further comprising a user key setting section for setting a user key by adding to the access key a name of a user who is permitted to access the access key, wherein, upon input of the user key by the input section, the retrieving section makes reference to the access keys stored in the storage section, retrieves an access key that corresponds to the user key from the storage section, and allows the decoding section to decode a file data corresponding to the file name by means of the retrieved access key.

3. A file data retrieving device of claim 1, further comprising a judging section for judging whether a file data that has not been encoded is stored in the storage section, wherein upon judgment that a file data that has not been encoded is stored in the storage section, the extracting section is allowed to extract, from the file data that has not been encoded, a file name and a plurality of key words related to the file data; the storage processing section is allowed to store the extracted key words as access keys of the file data in the storage section in correspondence with the stored file data; and the retrieving section is allowed to search for an access key that coincides with the search character string which is input by the input section for retrieving the file name of the file data and to retrieve the file name that corresponds to the access key.

4. A recording medium containing a computer program for controlling a file data retrieving device, the computer program performing the functions of:

causing a computer operation to input a search character string and various instructions from an input section;

causing a computer operation to previously store a plurality of encoded file data in a storage section;

causing a computer operation to decode the encoded file data by use of a cryptograph key prepared in advance;

causing a computer operation to extract, from the decoded file data, a plurality of key words and a file name related to the file data;

causing a computer operation to encode the extracted key words;

causing a computer operation to store the encoded key words as access keys of the file data in the storage section in correspondence with the stored file data; and causing a computer operation to encode the search character string which is input by the input section for retrieving the file name of the encoded file data, to search for an access key that coincides with the encoded search character string, and to retrieve the file name that corresponds to the access key.

* * * * *